United States Patent [19]
Nagai et al.

[11] Patent Number: 5,318,615
[45] Date of Patent: Jun. 7, 1994

[54] METHOD OF AND APPARATUS FOR FORMING BENT SHEET GLASS

[75] Inventors: Yasuyuki Nagai; Kazunori Yuki, both of Tokyo, Japan

[73] Assignee: Nippon Sheet Glass Co., Ltd., Japan

[21] Appl. No.: 940,655

[22] Filed: Sep. 4, 1992

[30] Foreign Application Priority Data

Sep. 4, 1991 [JP] Japan .................... 3-253133

[51] Int. Cl.⁵ .......................................... C03B 23/035
[52] U.S. Cl. ........................................ 65/104; 65/106; 65/268; 65/273; 65/356
[58] Field of Search .................. 65/106, 273, 287, 355, 65/356, 268, 104

[56] References Cited

U.S. PATENT DOCUMENTS

| | | | |
|---|---|---|---|
| 3,421,875 | 1/1969 | Kirkman | 65/273 |
| 4,075,381 | 2/1978 | Furukawa et al. | |
| 5,009,694 | 4/1991 | Nishitani et al. | 65/104 |
| 5,143,535 | 9/1992 | Herrington et al. | 65/106 |

FOREIGN PATENT DOCUMENTS 52-078226  7/1977  Japan .

Primary Examiner—Joye L. Woodard
Attorney, Agent, or Firm—Merchant, Gould, Smith, Edell, Welter & Schmidt

[57] ABSTRACT

A heated sheet of glass discharged from a heating furnace is lifted by a ring mold until it is held against a fully continuous lower molding surface of a bent shape of an upper mold. After the sheet of glass is held against the lower molding surface by the ring mold, a vacuum is developed in the upper mold to attract the sheet of glass to the lower molding surface through suction holes defined in the lower molding surface. Thereafter, the ring mold is lowered away from the upper mold to allow the sheet of glass to be bent by the lower molding surface while the sheet of glass is being attracted thereto only under the vacuum developed in the upper mold. The sheet of glass is continuously attracted under the vacuum to the lower molding surface until the sheet of glass is annealed.

13 Claims, 10 Drawing Sheets

METHOD OF AND APPARATUS FOR FORMING BENT SHEET GLASS

BACKGROUND OF THE INVENTION

1. Field of the Invention

The present invention relates to a method of and an apparatus for forming a bent sheet of glass such as an automobile front windshield or the like.

2. Description of the Prior Art

For manufacturing a bent sheet of glass such as an automobile front windshield, for example, it has been customary to heat a sheet of glass up to a temperature near its softening point while it is being fed by horizontal rolls in a heating furnace, and then to transfer the heated sheet of glass onto a ring mold that is positioned below an upper mold having a fully continuous molding surface. The heated sheet of glass is thereafter pressed to a desired bent configuration between the ring mold and the upper mold.

During the pressing of the heated sheet of glass, the ring mold is held in contact with the peripheral edge of the glass sheet for a relatively long period of time. Therefore, plane compressive stresses are developed in the peripheral edge of the glass sheet by the ring mold, and hence plane tensile stresses are also developed in the region of the glass sheet inward of the peripheral edge thereof to equilibrate the plane compressive stresses developed in the peripheral edge. These plane stresses are different from stresses that are produced transversely in the glass sheet when it is tempered. If the plane stresses in the glass sheet are unduly large, then the glass sheet will tend to break when it is set in an automobile windshield frame or subjected to other stresses after set in an automobile windshield frame.

Japanese laid-open patent publication No. 52-78226 discloses a proposal for keeping plane compressive stresses and plane tensile stresses within a predetermined range in a laminated sheet of glass for use as an automobile front windshield.

However, it has been quite difficult to maintain, within a predetermined range, plane compressive stresses which are developed in the peripheral edge of a sheet of glass that is held in contact with a ring mold for a long period of time. Even if the developed plane compressive stresses can successfully be held in the predetermined range, they are liable to cause the glass sheet to shatter under certain conditions.

SUMMARY OF THE INVENTION

It is an object of the present invention to provide a method of and an apparatus for forming a bent sheet of glass with minimum residual stresses.

According to the present invention, there is provided an apparatus for forming a bent sheet of glass, comprising an upper mold of a hollow structure having a fully continuous lower molding surface of a bent shape with a plurality of suction holes defined therein, a lower mold disposed below the upper mold and movable toward and away from the upper hollow mold, the lower mold comprising a ring mold for supporting a peripheral edge of a sheet of glass thereon, suction means for developing a vacuum in the upper mold to attract the sheet of glass against the lower molding surface through the suction holes, moving means for lifting the ring mold toward the upper mold until the sheet of glass supported on the ring mold is held against the lower molding surface, and for subsequently lowering the ring mold away from the upper mold after the sheet of glass is attracted to the lower molding surface under the vacuum developed in the upper mold by the suction means, whereby the sheet of glass can be bent by the lower molding surface while the sheet of glass is being attracted thereto only under the vacuum, and heating means for heating at least the lower molding surface of the upper mold up to a predetermined temperature.

The suction means continuously develops a vacuum in the upper mold to keep attracting the sheet of glass against the lower molding surface through the suction holes after the ring mold is lowered away from the upper mold by the moving means.

According to the present invention, there is also provided a method of forming a bent sheet of glass, comprising the steps of lifting a heated sheet of glass with a ring mold until the sheet of glass is held against a fully continuous lower molding surface of a bent shape of an upper mold, attracting the sheet of glass under a vacuum to the lower molding surface after the sheet of glass is held against the lower molding surface by the ring mold, thereafter lowering the ring mold away from the upper mold to allow the sheet of glass to be bent by the lower molding surface while the sheet of glass is being attracted thereto only under the vacuum, and continuously attracting the sheet of glass under the vacuum to the lower molding surface until the temperature of the sheet of glass drops to a predetermined temperature. The predetermined temperature is about 550° C.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

FIGS. 1 through 4 show an apparatus for forming a bent sheet of glass according to the present invention.

Figure 1:
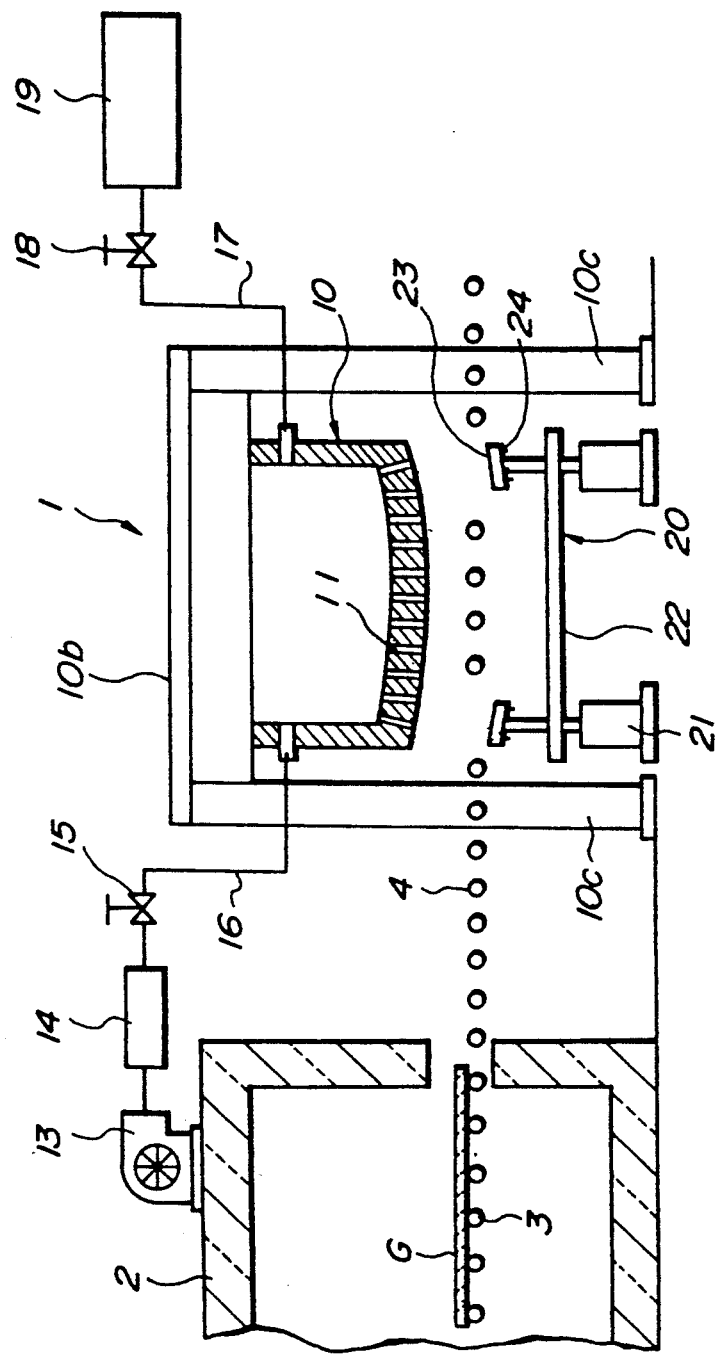
FIG. 1 is a schematic side elevational view, partly in cross section, of an apparatus for forming a bent sheet of glass according to the present invention.

As shown in FIG. 1, the apparatus, generally designated by the reference numeral 1, is positioned downstream of a tunnel-shaped heating furnace 2 with respect to the direction in which a glass sheet G is fed from the heating furnace 2 to the apparatus 1. In the heating furnace 2, the glass sheet G is heated up to a temperature close to its softening point while it is being fed by a succession of horizontal feed rolls 3 in the heating furnace 2. The heated glass sheet G is discharged out of the heating furnace 2 and then introduced into the apparatus 1 in which the heated glass sheet G is placed between an upper mold 10 and a lower mold 20.

A series of bending rolls 4, which are arranged successively from the feed rolls 3 in substantially horizontal alignment therewith, extend horizontally from the heating furnace 2 through the apparatus 1. The bending rolls 4 serve to preliminarily shape the glass sheet G to a slightly bent configuration while they are feeding the glass sheet G to and in the apparatus 1. Therefore, when the glass sheet G reaches a position between the upper and lower molds 10, 20 in the apparatus 1, i has been slightly bent by the bending rolls 4.

Figure 2:
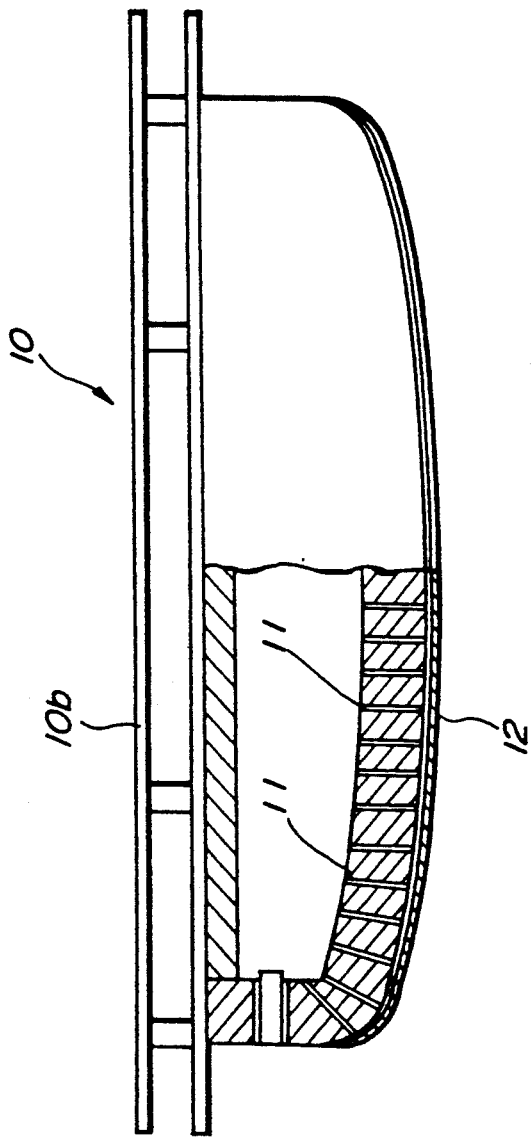
FIG. 2 is an enlarged side elevational view, partly in cross section, of an upper mold of the apparatus shown in FIG. 1.

The upper mold 10 of the apparatus 1 is cast of ceramics, and is of a hollow structure including a lower panel having a fully continuous lower molding surface 10a which lies above the bending rolls 4. The molding surface 10a is of a downwardly convex bent shape to be imparted to the glass sheet G. The lower panel of the upper mold 10 has a multiplicity of suction holes 11 defined vertically therethrough and opening at the molding surface 10a. The suction holes 11 communicate with the interior space of the hollow upper mold 10. The lower molding surface 10a is covered with a stainless steel cloth 12, as shown in FIG. 2. As shown in FIG. 1, the lower mold 10 is supported on and suspended from an upper support 10b mounted on the upper ends of vertical columns 10c.

Figure 3:
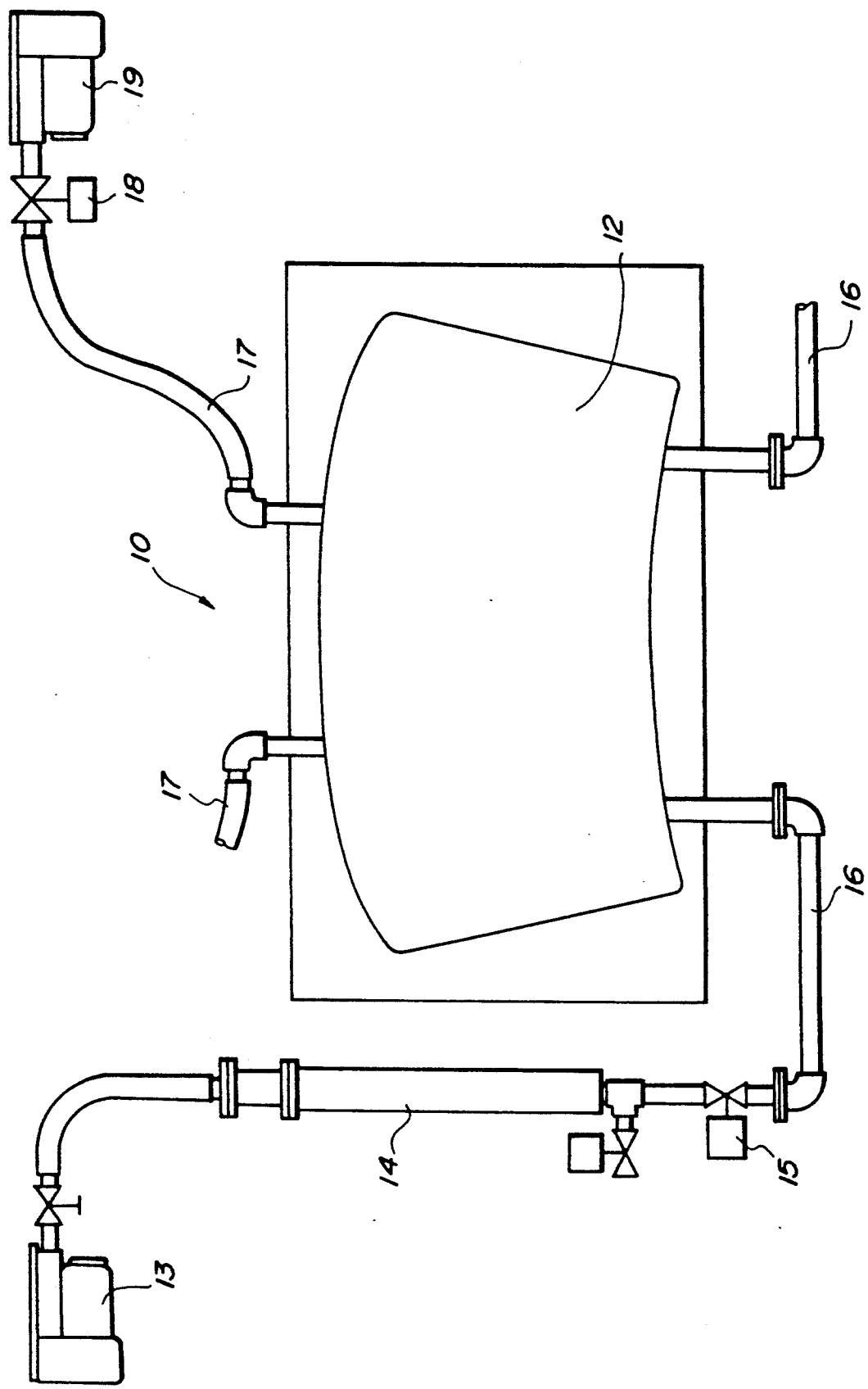
FIG. 3 is a bottom view of the upper mold.

As shown in FIGS. 1 and 3, heated air in the heating furnace 2 is drawn by an air blower 13 mounted on the heating furnace 2, and then heated again by a heater 14 coupled to the air blower 13. The heated air is introduced through a valve 15 and a pipe 16 into the hollow upper mold 10. The interior space of the hollow upper mold 10 communicates with a vacuum pump or suction blower 19 through a pipe 17 and a valve 18. When the vacuum pump 19 is actuated, the interior space of the hollow upper mold 10 is evacuated. When the air blower 13 is actuated, it draws heated air from the heating furnace 2 and delivers the heated air into the upper mold 10. Since the air blower 13 discharges heated air from the heating furnace 2, it is effective in increasing the thermal efficiency of the heating furnace 2. However, other known means may be employed to increase the thermal efficiency of the heating furnace 2.

Figure 4:
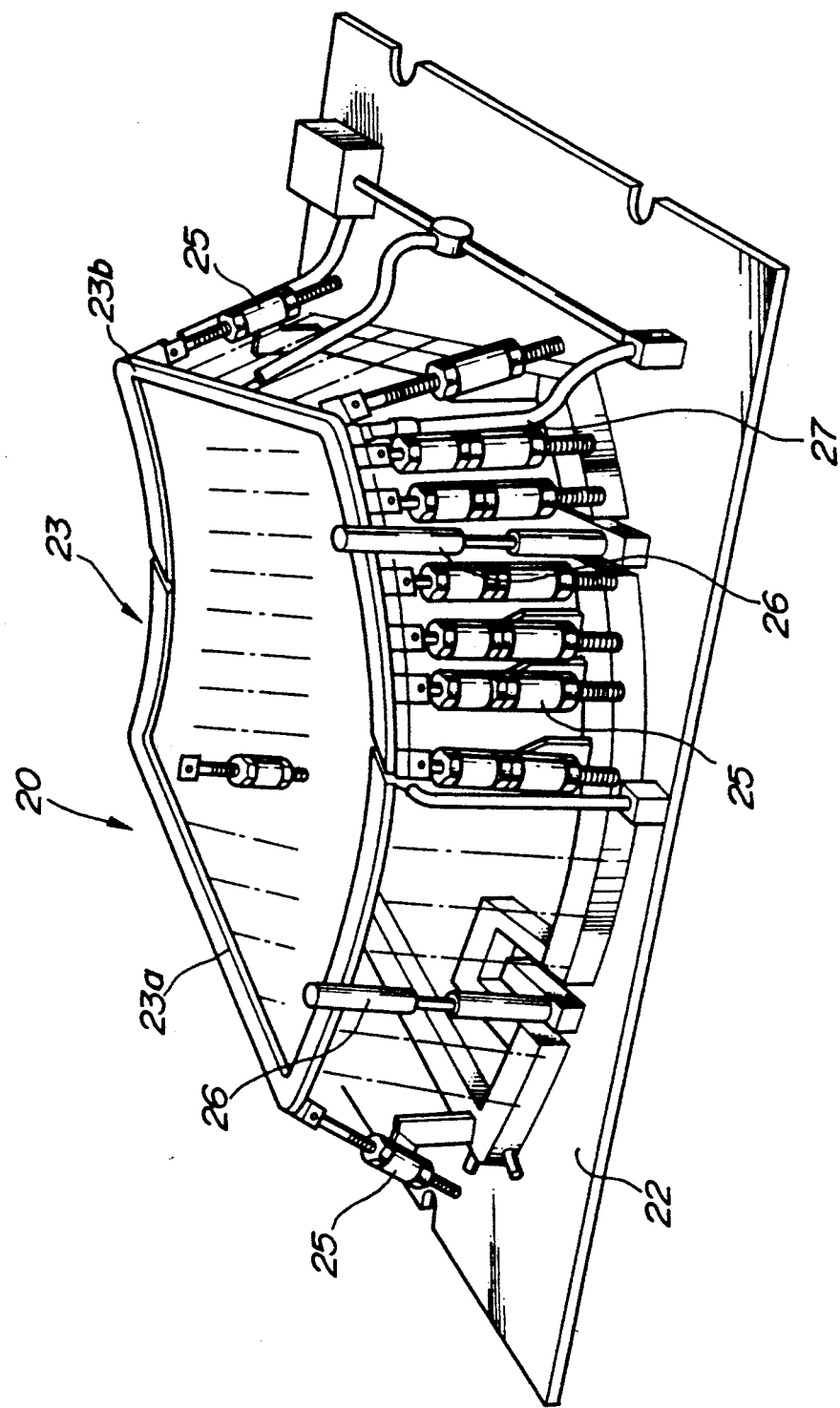
FIG. 4 is a perspective view of a ring mold of the apparatus shown in FIG. 1.

The lower mold 20 comprises a ring mold 23 positioned below the upper mold 10 and mounted on a base 22 that is vertically movably supported by a plurality of cylinder units 21. The ring mold 23 is of a centrally open ring-shaped structure for engaging only the peripheral edge of the glass sheet G. Before the glass sheet G is brought into the position between the upper and lower molds 10, 20, the cylinder units 21 are contracted to position the ring mold 23 beneath the bending rolls 4. The ring mold 23 is sized and shaped to support the lower surface of the glass sheet G along its peripheral edge. The ring mold 23 is made of iron and has its upper surface covered with a stainless steel cloth. The lower mold 20 includes a heater 24 attached to the lower surface of the ring mold 23, for heating the ring mold 23. As shown in FIG. 4, the ring mold 23 is composed of two separate ring mold halves 23a, 23b that are supported on the base 22 by a number of turnbuckles 25. The turnbuckles 25 can individually be adjusted in length to vary the three-dimensional shape of the ring mold 23 into conformity with the shape of the glass sheet G.

The lower mold 20 also includes a plurality of vertically movable stoppers 26 mounted on the base 22 for positioning the glass sheet G, which has been fed by the bending rolls 4 into the apparatus 1, with respect to the ring mold 23. A temperature sensor 27 comprising a thermocouple is also mounted on the base 22 for detecting the temperature of the ring mold 23.

Figure 5:
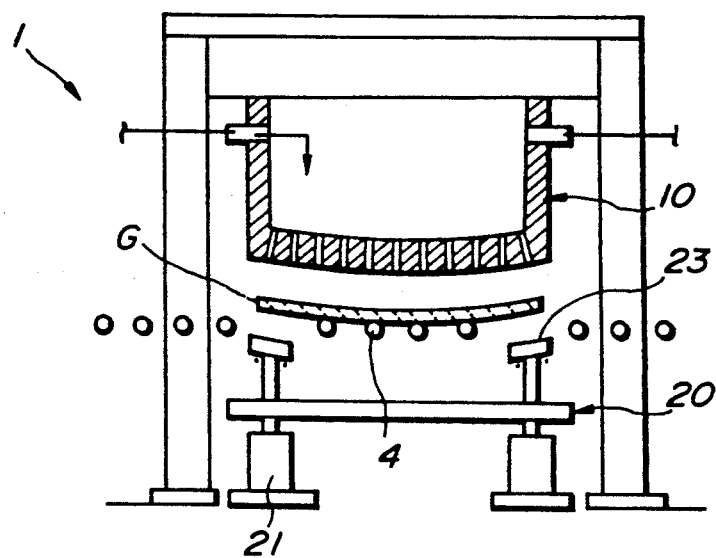
FIGS. 5, 6, and 7 are schematic side elevational views, partly in cross section, showing the manner in which a bent sheet of glass is formed by the apparatus.

Operation of the apparatus 1 for forming a bent glass sheet will be described below with reference to FIGS. 5 through 7.

The glass sheet G is heated up to a temperature close to its softening point while it is being fed by the feed rolls 3 in the heating furnace 2. The heated glass sheet G is discharged out of the heating furnace 2 and then introduced into the apparatus 1 while the glass sheet G is being preliminarily bent by the bending rolls 4. In the apparatus 1, the glass sheet G is fed to a position above the ring mold 23, as shown in FIG. 5, and positioned with respect to the ring mold 23 by the stoppers 26. At this time, the hollow space in the upper mold 10 is supplied with heated air from the heating furnace 2 by the air blower 13. The heated air from the heating furnace 2 is heated again by the heater 14 on its way into the upper mold 10. The heated air supplied to the hollow space in the upper mold 10 flows through the suction holes 11 to the molding surface 10a, thereby heating the molding surface 10a up to a predetermined temperature.

Figure 6:
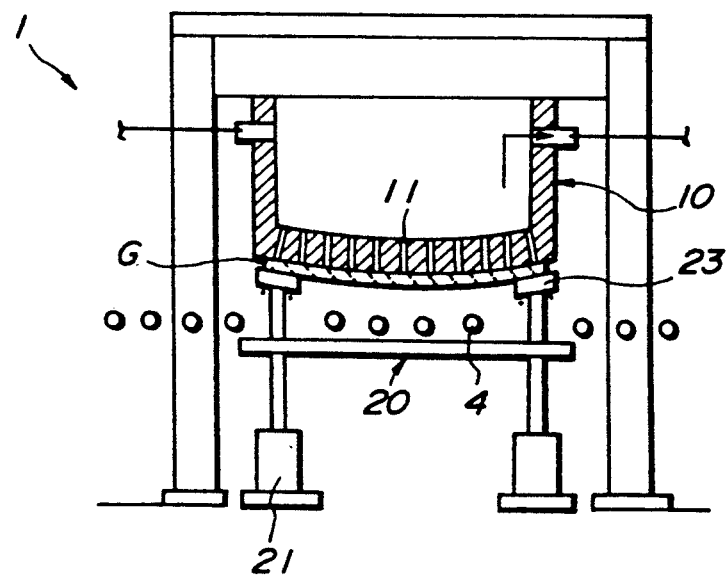

Then, as shown in FIG. 6, the cylinder units 21 of the lower mold 20 are extended to elevate the ring mold 23, which is heated by the heater 24, into bearing engagement with the peripheral edge of the glass sheet G. Continued upward movement of the ring mold 23 causes the ring mold 23 to lift the glass sheet G off the bending rolls 4. On further ascending movement of the ring mold 23, the glass sheet G is pressed against the molding surface 10a. At this time, the supply of the heated air from the heating furnace 2 into the upper mold 10 is stopped by the valve 15. The vacuum pump 19 is actuated to evacuate the interior space of the upper mold 10, whereupon the glass sheet G is attracted against the molding surface 10a under a vacuum acting through the holes 11.

Figure 7:
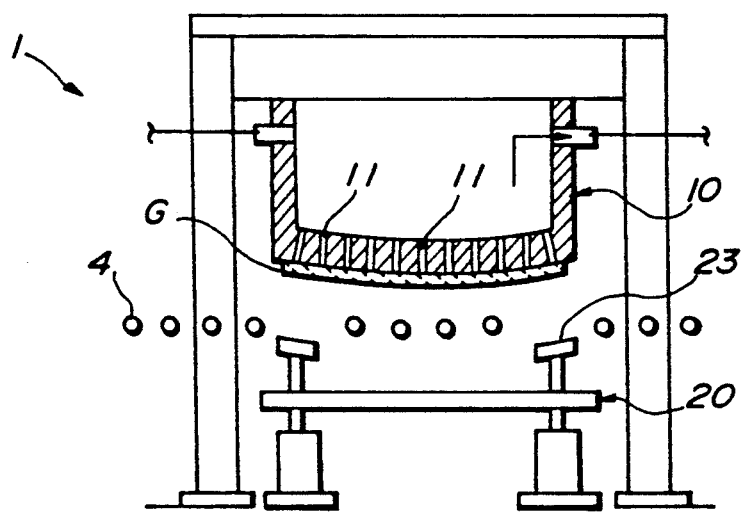

After the glass sheet G has been attracted against the molding surface 10a, the cylinder units 21 are contracted to lower the ring mold 23 to its original position beneath the bending rolls 4, as shown in FIG. 7. The glass sheet G is now held against the molding surface 10a only under the vacuum developed in the upper mold 10. Since the molding surface 10a has been heated and the glass sheet G has also been heated, the glass sheet G is bent to a curved shape complementary to the downwardly convex shape of the molding surface 10a.

After the glass sheet G has been fully shaped by the molding surface 10a, the glass sheet G remains attracted to the molding surface 10a for a predetermined period of time. While the glass sheet G is being thus held on the molding surface 10a, the glass sheet G is annealed to a temperature at which plane compressive stresses in the glass sheet G is substantially reduced or relieved.

A test was conducted on glass sheets according to conventional, comparative, and inventive examples to determine plane compressive and tensile stresses developed in the glass sheets. The results of the test are shown in the following tables:

|  | I | II | III | IV |
|---|---|---|---|---|
| Conventional example | 8.3 | 1.5 | A: 50<br>B: 70~80 | C: 630~633 |
| Comparative example 1 | " |  " | A: 134~154<br>B: 134~154 | C: 630~633 |
| Comparative example 2 | 2.2 (before suction);<br>0.6 (after suction) | 5.8 | A: 47<br>B: 70~80 | C: 631~635<br>D: -250 |
| Comparative example 3 | 2.2 (before suction);<br>0.6 (after suction) | 11.3 | A: 56<br>B: 70~80 | C: 630~631<br>D: -250 |
| Comparative example 4 | 2.2 (before suction);<br>0.6 (after suction) | 16.0 | A: 47<br>B: 70~80 | C: 629~630<br>D: -250 |
| Comparative example 5 | 2.2 (before suction);<br>0.6 (after suction) | 21.5 | A: 50<br>B: 70~80 | C: 629~631<br>D: -250 |
| Inventive example 1 | 2.2 (before suction);<br>0.6 (after suction) | 5.8 | A: 134-154<br>B: 100~110 | C: 628~630<br>D: -250 |
| Inventive example 2 | 2.2 (before suction);<br>0.6 (after suction) | 11.3 | A: 139-145<br>B: 111~112 | C: 628~630<br>D: -250 |
| Inventive example 3 | 2.2 (before suction);<br>0.6 (after suction) | 16.0 | A: 142-147<br>B: 99~102 | C: 629~630<br>D: -250 |
| Inventive example 4 | 2.2 (before suction);<br>0.6 (after suction) | 21.5 | A: 138-152<br>B: 90~100 | C: 628~629<br>D: -250 |

| | Plane stresses (measured by polarimeter) | | | | | |
|---|---|---|---|---|---|---|
| | Trailing edge | | | Leading edge | | |
| | E/C (kg/cm$^2$) | T/M (kg/cm$^2$) | T/M position (mm) | E/C (kg/cm$^2$) | T/M (kg/cm$^2$) | T/M position (mm) |
| Conventional example | −555 | 79 | 20 | −1324 | 138 | 40 |
| Comparative example 1 | −863 | 70 | 25 | −1500 | 112 | 50 |
| Comparative example 2 | −730 | 44 | 110 | −1255 | 88 | 40 |
| Comparative example 3 | −686 | 59 | 110 | −1315 | 71 | 40 |
| Comparative example 4 | −664 | 79 | 70 | −1267 | 109 | 40 |
| Comparative example 5 | −682 | 74 | 70 | −1400 | 113 | 30 |
| Inventive example 1 | −320 | 38 | 110 | −1508 | 64 | 30 |
| Inventive example 2 | −555 | 55 | 110 | −1160 | 80 | 50 |
| Inventive example 3 | −648 | 66 | 90 | −1168 | 79 | 50 |
| Inventive example 4 | −307 | 44 | 130 | −1438 | 71 | 50 |

I: Time in which the glass sheet contacted the ring mold (seconds);
II: Time in which the glass sheet contacted the upper mold (seconds);
III Mold temperatures (°C.) (A: Stainless cloth of upper mold, B: Ring mold);
IV: C: Temperature (°C.) of the glass sheet right after it is fed out of the furnace, and D: Vacuum (mmAq) developed in the upper mold;
E/C: Maximum plane compressive stresses developed in the edge of the glass sheet;
T/M: Maximum plane tensile stresses developed in the glass sheet; and
T/M position: Position spaced from the trailing or leading edge of the glass sheet where the maximum plane tensile stresses are developed.

I: Time in which the glass sheet contacted the ring mold (seconds); II; Time in which the glass sheet contacted the upper mold (seconds); III Mold temperatures (° C.) (A: Stainless cloth of upper mold, B: Ring mold;

IV: C: Temperature (° C.) of the glass sheet right after it is fed out of the furnace, and D: Vacuum (mmAq) developed in the upper mold; E/C: Maximum plane compressive stresses developed in the edge of the glass sheet; T/M: Maximum plane tensile stresses developed in the glass sheet; and T/M position: Position spaced from the trailing or leading edge of the glass sheet where the maximum plane tensile stresses are developed.

In the conventional example, the glass sheet was pressed to shape between the ring mold and the upper mold with no vacuum developed in the upper mold, and the upper mold and the ring mold were not heated. In the comparative example 1, the glass sheet was pressed to shape between the ring mold and the upper mold with no vacuum developed in the upper mold, and the upper mold and the ring mold were heated. In each of the comparative examples 2 through 5, the glass sheet was shaped by being attracted to the lower molding surface of the upper mold under a vacuum developed in the upper mold, and the upper mold and the ring mold were not heated. Specifically, the vacuum was developed in the upper mold for 4, 10, 15, 20 seconds respectively in the comparative examples 2, 3, 4, 5. In each of the inventive examples 1 through 4, the glass sheet was shaped by being attracted to the lower molding surface of the upper mold under a vacuum developed in the upper mold, and the upper mold and the ring mold were heated. Specifically, the vacuum was developed in the upper mold for 4, 10, 15, 20 seconds respectively in the inventive examples 1, 2, 3, 4.

Figure 8:
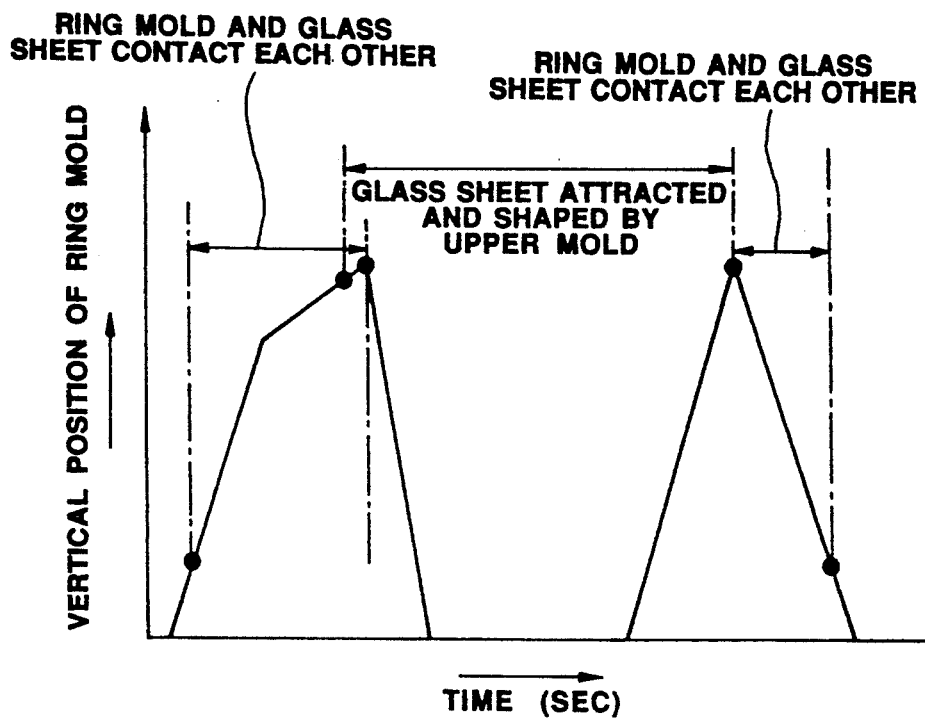
FIG. 8 is a timing chart of operation of the ring mold according to the present invention.
Figure 9:
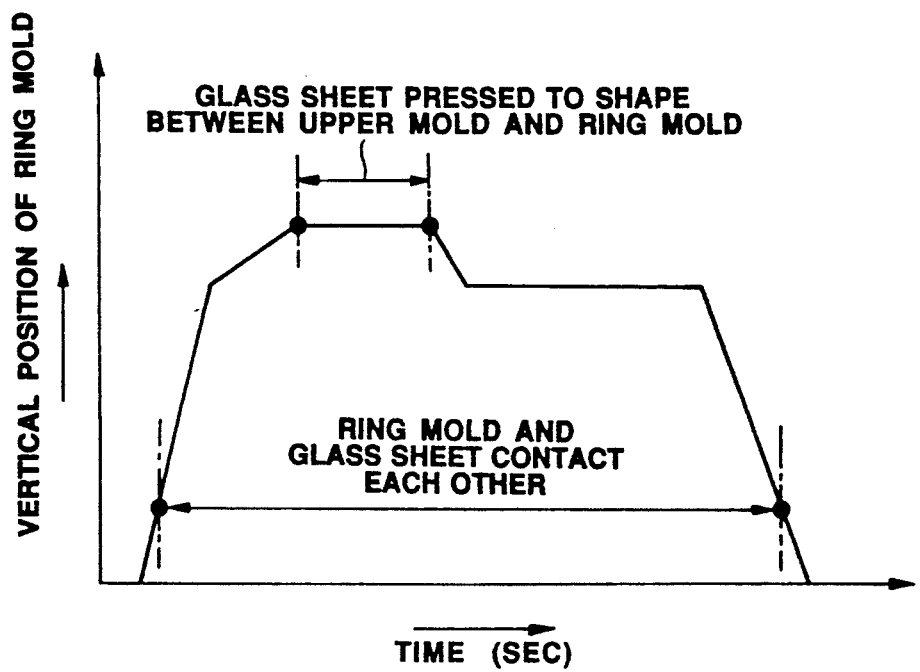
FIG. 9 is a timing chart of operation of a conventional ring mold.

In each of the inventive examples 1 through 4, the glass sheet is held in contact with the ring mold for relatively short periods of time as shown in FIG. 8, and the glass sheet is shaped to a bent configuration only by the upper mold. In the conventional example, the glass sheet is shaped to a bent configuration between the upper and ring molds for a relatively long period of time as shown in FIG. 9.

Figure 10:
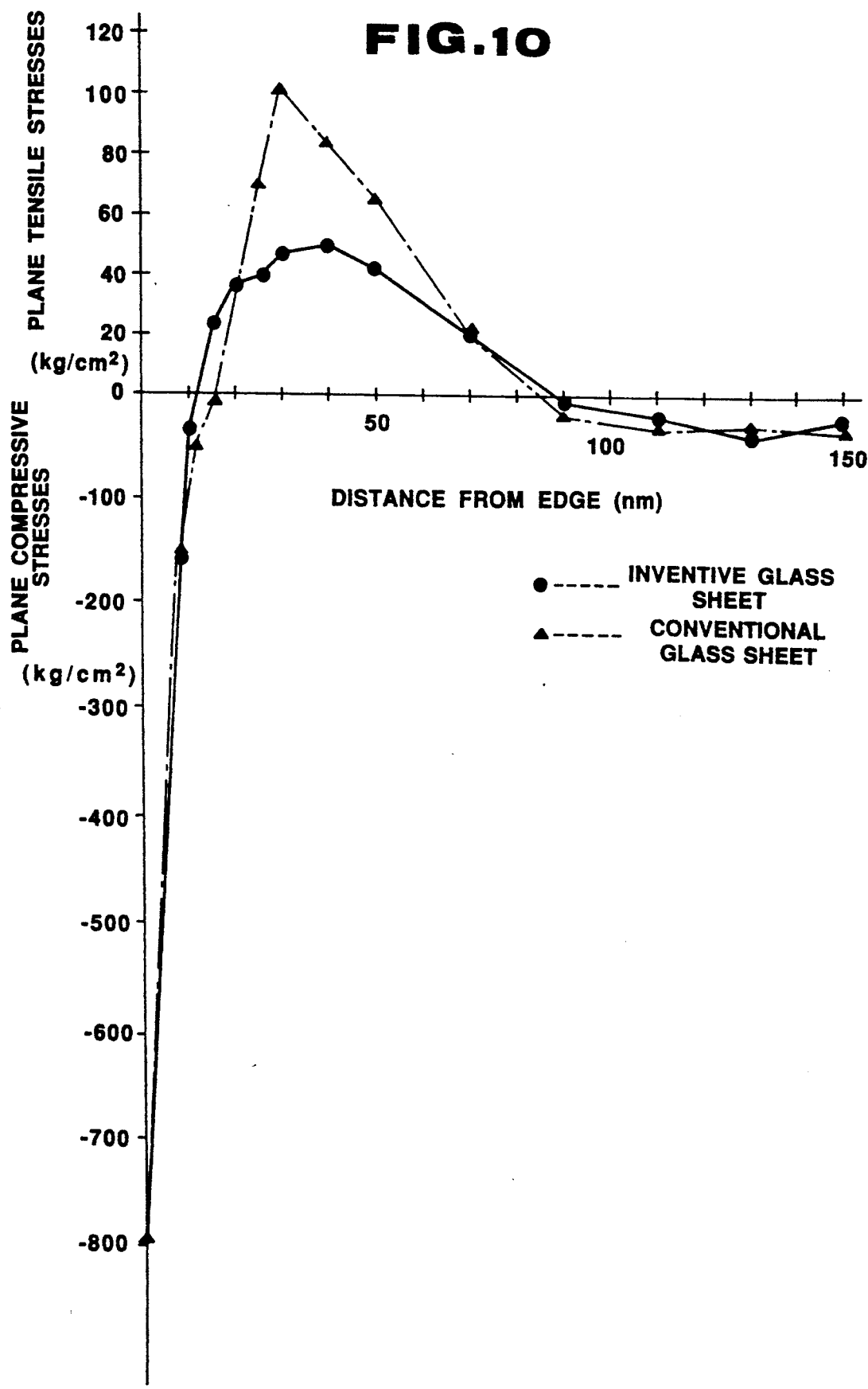
FIG. 10 is a graph showing the relationship between the distance of an edge of sheets of glass formed respectively by the apparatus according to the present invention and the conventional apparatus, and plane compressive and tensile stresses developed in the sheets of glass.
Figure 11:
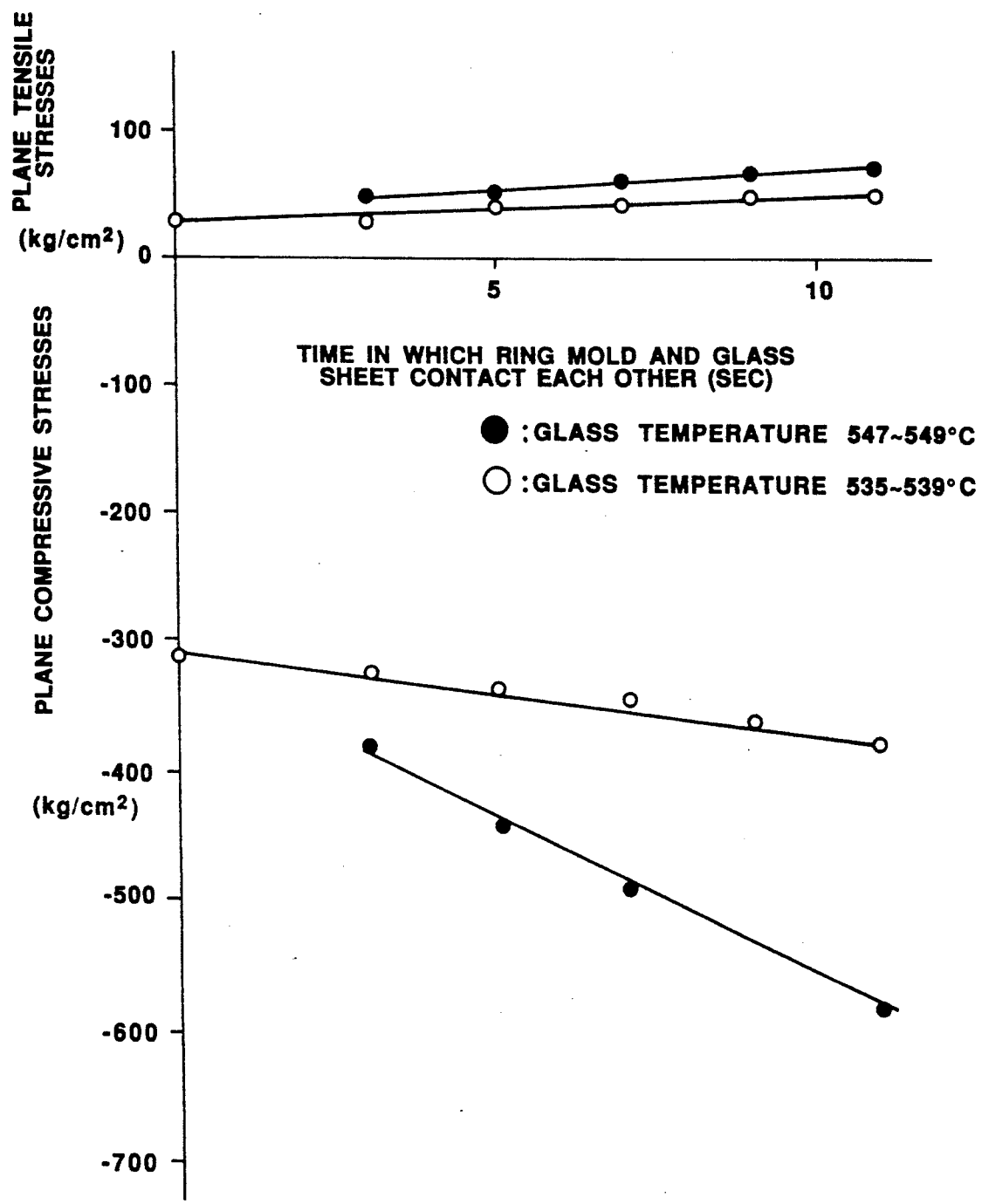
FIG. 11 is a graph showing the relationship between the time in which the ring mold and the sheet of glass are held in contact with each other, and plane compressive and tensile stresses developed in the sheet of glass.
Figure 12:
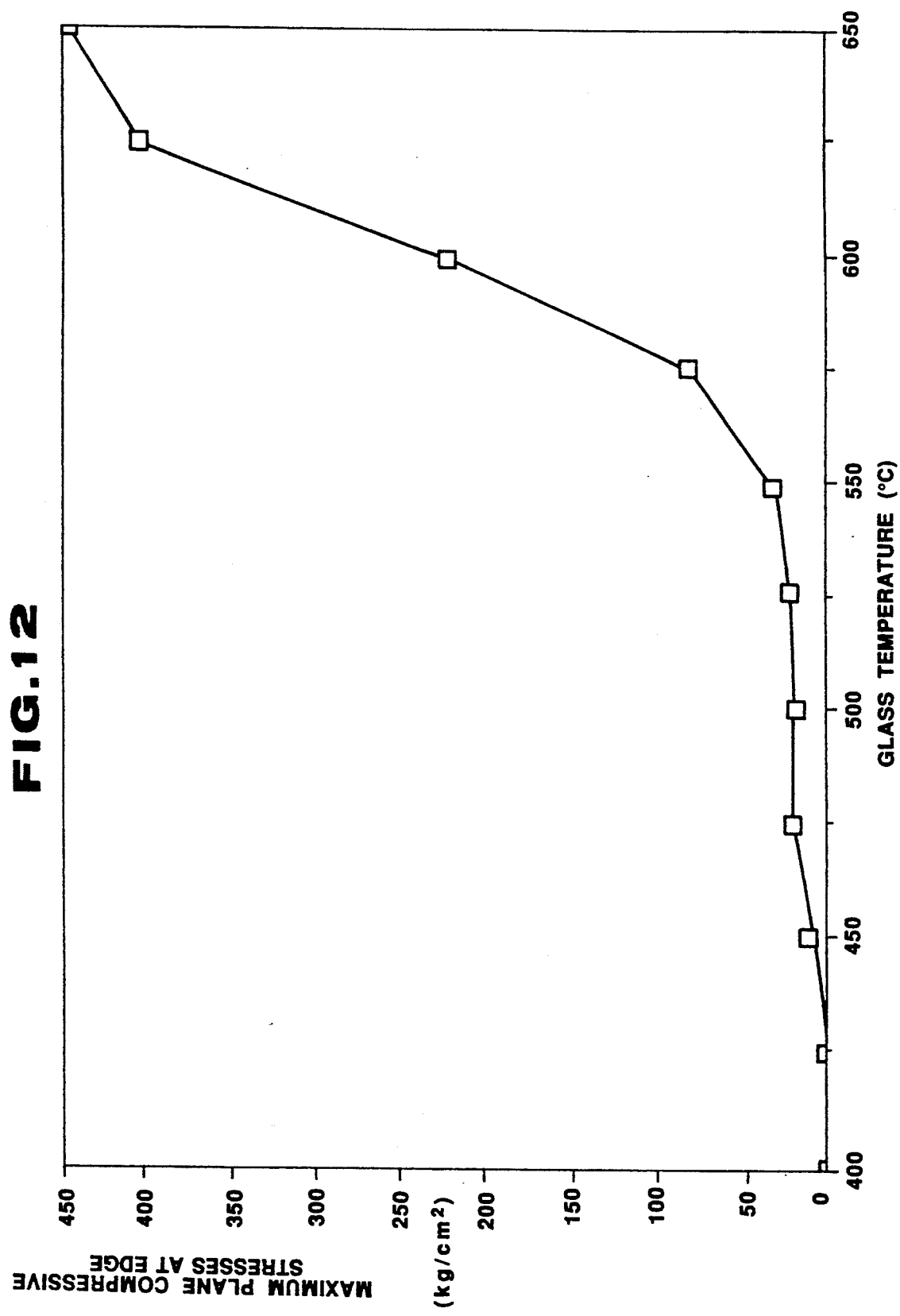
FIG. 12 is a graph showing the relationship between the temperature of the sheet of glass and maximum plane compressive stresses developed in an edge of the sheet of glass.

FIG. 10 shows plane compressive and tensile stresses developed in the inventive and conventional glass sheets at positions spaced from edges thereof. FIG. 11 illustrates the relationship between the time in which the ring mold and the sheet of glass are held in contact with each other, and plane compressive and tensile stresses developed in the sheet of glass, and FIG. 12 shows the relationship between the temperature of the sheet of glass and maximum plane compressive stresses developed in an edge of the sheet of glass.

As can be seen from the above tables and FIG. 10, it is important that the time in which the ring mold and the glass sheet contact each other be shortened and the upper mold be heated in order to reduce the plane compressive stresses developed in the glass sheet. Furthermore, it can be seen from FIG. 11 that the lower the temperature of the glass sheet when it is held in contact with the ring mold, the lower the developed plane stresses, and from FIG. 12 that substantially no plane compressive stresses are developed in the edge of the glass sheet after the glass sheet has been held by the upper mold until the temperature of the glass sheet drops down to 550° C.

In the illustrated embodiment, the glass sheet is bent to shape after it is fed out of the furnace. However, the glass sheet may be shaped while it is kept within the furnace. While the heater 14 for heating air supplied to the upper mold 10 is positioned in spaced-apart relationship from the upper mold 10 in the illustrated embodiment, a heater may be embedded in the upper mold 10 for heating the upper mold 10.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. A method for forming a bent sheet of glass, comprising the steps of:
   heating a lower molding surface of an upper mold to a predetermined temperature;
   lifting a heated sheet of glass with a ring mold until the sheet of glass is held against the lower molding surface of a bent shape of the upper mold;
   attracting the sheet of glass under a vacuum to said lower molding surface after the sheet of glass is held against said lower molding surface by said ring mold;
   immediately thereafter lowering said ring mold away from said upper mold to allow the sheet of glass to be bent solely by said lower molding surface while the sheet of glass is being attracting thereto only under said vacuum; and
   continuously attracting the sheet of glass under the vacuum to said lower molding surface until the sheet of glass is annealed to a predetermined temperature.

2. A method according to claim 1, wherein said predetermined temperature is about 550° C.

3. A method according to claim 1, further including the step of heating said ring mold.

4. A method according to claim 1, wherein the step of attracting the sheet of glass for bending and annealing thereof is continued within a time range from 4 to 20 seconds.

5. A method according to claim 1, wherein the step of heating said lower molding surface of said upper mold is finished when the sheet of glass is held against said lower molding surface and before the step of attracting the sheet of glass under a vacuum to said lower molding surface.

6. A method according to claim 5, further including the step of heating the sheet of glass in a heating furnace before the step of lifting said sheet of glass with said ring mold, and wherein the upper mold has a hollow structure and the step of heating said lower molding surface of the upper mold comprises the step of drawing heated air out of the heating furnace and introducing the heated air into said hollow structure of the upper mold so as to heat said lower molding surface.

7. An apparatus for forming a bent sheet of glass, comprising:
   an upper mold of a hollow structure having a fully continuous lower molding surface of a bent shape;
   a lower mold disposed below said upper mold and movable toward and away from said upper hollow mold, said lower mold comprising a ring mold for supporting a peripheral edge of said sheet of glass when supported thereon;
   moving means for lifting said ring mold toward said upper mold until the sheet of glass when supported on said ring mold is held against said lower molding surface, and for subsequently lowering said ring mold away from said upper mold;

means for heating said lower molding surface of the upper mold to a predetermined temperature; and means for attracting the sheet of glass against said lower molding surface and annealing said sheet of glass, wherein said heating means heats said lower molding surface of the upper mold to said predetermined temperature and said attracting means keeps attracting the sheet of glass against said lower molding surface to anneal said sheet of glass after said ring mold is lowered away from said upper mold by said moving means.

8. An apparatus according to claim 7, wherein said lower mold includes a heater for heating said ring mold.

9. An apparatus according to claim 7, wherein said upper mold includes a stainless steel cloth attached to said lower molding surface.

10. An apparatus according to claim 7, wherein said heating means comprises heated air supplied to said upper mold.

11. An apparatus according to claim 7, wherein said lower molding surface includes suction holes and wherein said attracting means continuously develops a vacuum to hold said sheet of glass for bending and annealing of the sheet of glass within a time range from 4 to 20 seconds.

12. An apparatus according to claim 7, further comprising switching means for switching from said heating means to said attracting means to be enabled when the sheet of glass supported on said ring mold is pressed against said lower molding surface by said moving means.

13. An apparatus according to claim 7, wherein said heating means further comprises heated-air introducing means adapted to be coupled to a heating furnace which is disposed adjacent to said apparatus, said heated-air introducing means being capable of drawing heated air form the heating furnace and introducing the heated air into said hollow structure of the upper mold so as to heat said lower molding surface.

* * * * *

UNITED STATES PATENT AND TRADEMARK OFFICE
CERTIFICATE OF CORRECTION

| | | |
|---|---|---|
| PATENT NO. | : | 5,318,615 |
| DATED | : | June 7, 1994 |
| INVENTOR(S) | : | Nagai et al |

It is certified that error appears in the above-indentified patent and that said Letters Patent is hereby corrected as shown below:

Column 3, line 29, replace "i" with --it--

Column 6, delete lines 65 to 68

Column 7, delete lines 1 to 9.

Column 10, claim 13, line 18, replace "form" with --from--

Signed and Sealed this

First Day of November, 1994

BRUCE LEHMAN

*Attest:*

*Attesting Officer*

*Commissioner of Patents and Trademarks*